United States Patent [19]
Payne

[11] 3,829,609
[45] Aug. 13, 1974

[54] IMAGE-SPLITTING DEVICES FOR SIZING INSTRUMENTS

[75] Inventor: Bryan Oliver Payne, York, England

[73] Assignee: Vickers Limited, London, England

[22] Filed: Nov. 22, 1972

[21] Appl. No.: 308,698

[52] U.S. Cl. ............ 178/6.8, 178/DIG. 36, 356/163
[51] Int. Cl. ............ H04n 7/18
[58] Field of Search .......... 178/6, 6.5, DIG. 36, 6.8; 356/163, 199, 167

[56] References Cited

UNITED STATES PATENTS

| | | | |
|---|---|---|---|
| 2,436,516 | 2/1948 | Larson et al. | 178/6.5 |
| 2,634,327 | 4/1953 | Sziklai | 178/5.4 |
| 2,731,202 | 1/1956 | Pike | 235/92 |

OTHER PUBLICATIONS

George C. Sziklai, Steorescopic Television, July 4, 1950, Official Gazette, Vol. 636, Page 367.

*Primary Examiner*—Howard W. Britton
*Assistant Examiner*—Michael A. Masinick
*Attorney, Agent, or Firm*—Pennie & Edmonds

[57] ABSTRACT

An image-splitting device for a sizing instrument comprises a television camera unit for receiving an optical image, of an object to be sized, formed by means of a microscope objective, and producing from that image a video signal representative thereof. Electrical circuitry is connected to receive the video signal and to produce therefrom, on a television display unit, a pair of images which are each representative of the optical image and are not of mutually-reversed contrast. The pair of images are displaced in relation to one another across the image surface of the television display unit by a distance which can be varied selectively for sizing purposes.

13 Claims, 10 Drawing Figures

IMAGE-SPLITTING DEVICES FOR SIZING INSTRUMENTS

This invention relates to image-splitting devices for sizing instruments.

An object can be sized by amplitude-dividing a beam bearing an image of the object into two component beams which form respective images of the object at optically equivalent locations. If the two images are brought into the same field of view and their lateral separation is selectively varied the size of the object can be determined from the separation of the axes of the two component beams, as projected back to the object plane, when the two images just contact one another. Image-splitting microscopes are described in British Pat. Specification Nos. 901,319, 948,273 and 1,285,184. In each of these prior instruments the split images are viewed through an eyepiece or binocular viewing head, but less strain would be imposed upon a user of the instruments if the split images could be displayed on a television screen. Such a display system could be arranged to provide a more convenient viewing position, and incidentally control of sensitivity and contrast could be effected.

According to one aspect of the present invention there is provided a sizing instrument, comprising a microscope objective for forming an optical image of an object to be sized, a television camera for receiving the said optical image and producing from that image a video signal representative thereof, a television display unit, and electrical circuitry connected to receive the said video signal and operable to produce therefrom, on the television display unit, a pair of images which are each representative of the said optical image and are displaced in relation to one another across the image surface of the display unit by a selectively variable distance, so that the said distance can be varied for sizing purposes.

The microscope objective and the television display unit may be conventional items, sold separately from the rest of the sizing instrument. Thus, according to another aspect of the present invention there is provided an image-splitting device for a sizing instrument, comprising a television camera unit for receiving an optical image, of an object to be sized, formed by means of a microscope objective, and producing from that image a video signal representative thereof, and electrical circuitry connected to receive the said video signal and operable to produce therefrom, on a television display unit, a pair of images which are each representative of the said optical image and are displaced in relation to one another across the image surface of the display unit by a selectively variable distance, so that the said distance can be varied for sizing purposes.

Figure 1:
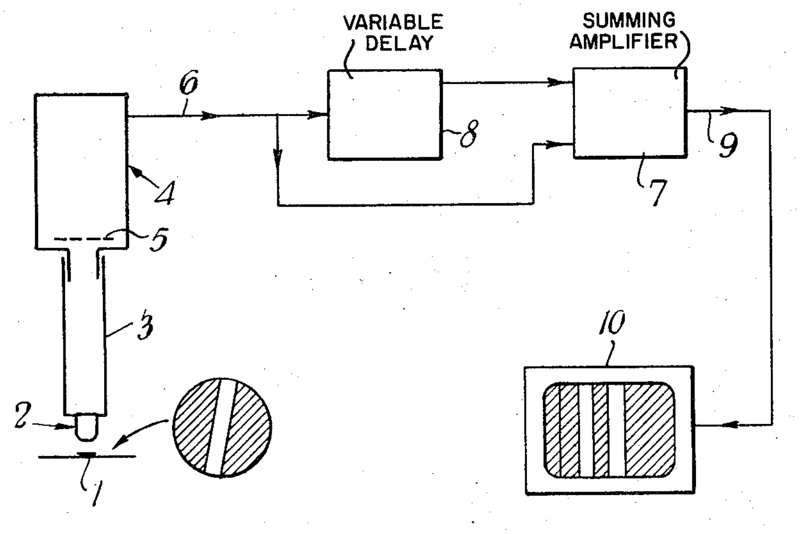
Figure 1B:
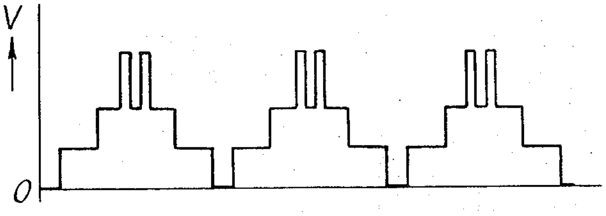
Figure 1A:
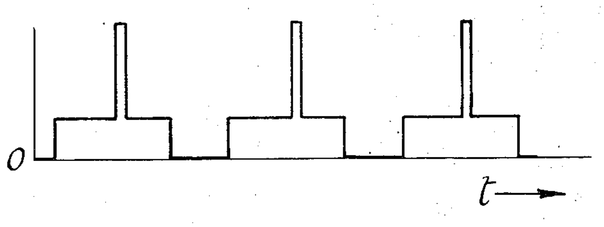
Figure 2:
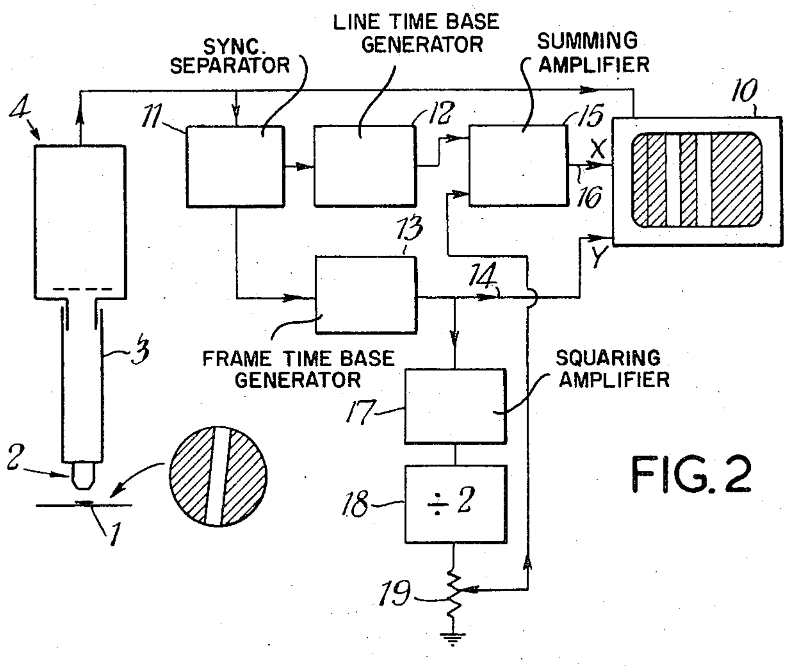
Figures 2A, 2B:
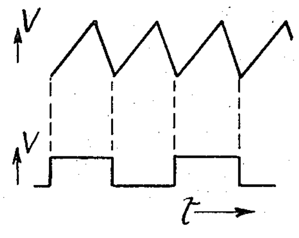
Figure 2C:
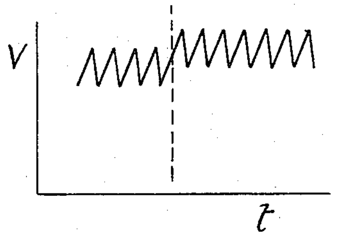

For a better understanding of the invention, and to show how the same may be carried into effect, reference will now be made, by way of example, to the accompanying diagrammatic drawings in which:

FIG. 1 shows a first sizing instrument,

FIGS. 1*a* and 1*b* show respective graphs of voltage against time,

FIG. 2 shows a second sizing instrument,

FIGS. 2*a*, 2*b* and 2*c* show respective graphs of voltage against time, the time scale in FIG. 2*c* being greatly expanded with respect to FIGS. 2*a* and 2*b*, and FIGS. 3, 4 and 5 show respective modifications of the FIG. 1 sizing instrument.

In the Figures like reference numerals indicate like components.

FIG. 1 illustrates an object 1, shown to a larger scale in an inset, positioned beneath a microscope having an objective 2 and a tube 3. The eyepiece of the microscope has been removed and in its place a television camera 4 is fitted in the microscope tube 3, a primary image of the object being formed by the objective 2 on the photocathode 5 of the camera tube. There may alternatively be a re-imaging system between the objective and the camera so that a relayed primary image is formed on the photocathode. The camera produces on its output line 6 an output video signal having the form indicated in FIG. 1*a*. The output video signal is fed to one input of a summing amplifier 7 which receives as its other input the output video signal after having passed through a calibrated variable delay system 8. The amplifier 7 provides on its output line 9 a composite video signal having the form indicated in FIG. 1*b* and this latter signal is fed to an oscilloscope 10 which forms on its image surface, i.e., its screen, the indicated display, which comprises two laterally displaced images of the object. The lateral spacing of the two images can be varied by adjusting the delay introduced by the system 8 and so the technique by measurement of image-splitting can be employed. The system 8 is calibrated to give a direct reading of the splitting distance as projected back to the plane of the photocathode 5 of the camera tube and, knowing the magnification of the microscope objective, this reading can be employed to give the splitting distance as projected back to the plane of the object.

In the arrangement shown in FIG. 2 the camera 4 is a sequentially scanning camera, and the output video signal from the camera 4 is employed to modulate the intensity of the light spot produced on the screen of the oscilloscope 10 and is fed to a sync separator 11 whereby the line and frame sync pulses in the video signal are separated and fed to a line time base generator 12 and a frame time base generator 13 respectively. The frame time base signal, which has the form indicated in FIG. 2*a*, is fed on a line 14 to the Y deflector coils of the oscilloscope 10 and the line time base signal is fed to one input of a summing amplifier 15 whose output is connected by a line 16 to the X deflector coils of the oscilloscope. The frame time base signal is also fed through a squaring amplifier 17 to a divider by two 18 which produces at its output during alternate cycles of the frame time base signal zero voltage and a constant positive voltage, as shown in FIG. 2*b*. The output of the divider 18 is connected to one fixed contact of a potentiometer 19 whose other fixed contact is earthed and whose sliding contact is connected to the other input of the summing amplifier 15. Thus, during every other cycle of the frame time base signal the summing amplifier 15 receives at its said other input a d.c. voltage which depends on the setting of the potentiometer 19 and is added to the line time base signal to produce an output signal which has the form indicated in FIG. 2*c* and which is delivered on the line 16 to the X deflector coils. The vertical dashed line in FIG. 2*c* indicates the end of one frame and the start of the next frame. Thus, alternate frames are laterally displaced relative to each other by an amount which depends on the setting of the potentiometer, which thus constitutes an image shearing control. The potentiometer is calibrated to give a direct reading of the splitting distance of the alternate frames as projected back to the plane of the photocathode of the camera tube. Knowing the magnification of the microscope objective this reading can be employed to give the splitting distance as projected back to the plane of the object. Thus, the FIG. 2 arrangement can be employed to size the object by the image-splitting technique.

If in the case of the FIG. 2 arrangement interlaced scanning is employed it would be possible to displace laterally alternate pairs of frames to retain the resolution advantage of the interlaced scan.

Figure 3:
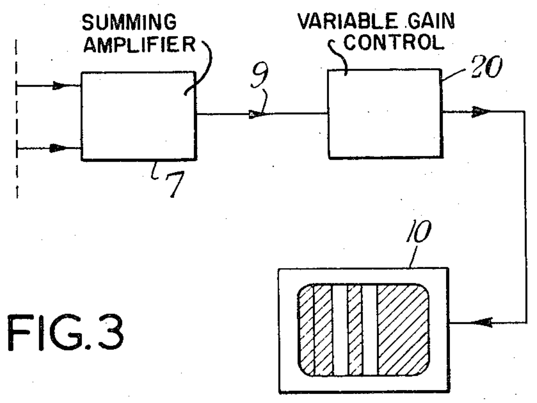

In each of the described arrangements the signals representing the two split images may be processed to enhance the contrast. This is especially useful in cases in which the object itself is of low contrast, for example a blood cell. FIG. 3 shows a modification of FIG. 1 including means for enhancing the contrast of the split images. The modification shown in FIG. 3 simply involves connecting a variable gain control 20 between the summing amplifier 9 and the oscilloscope 10.

Figure 4:
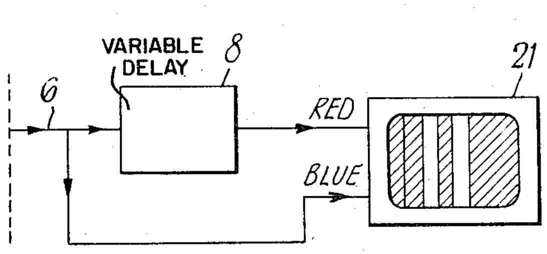

Of course, a television monitor could be used in place of the oscilloscope 10, and if a color display system were used it would be possible to achieve color differention. FIG. 4 shows a modification of FIG. 1 whereby color differentiation may be achieved. In the case of FIG. 4 the summing amplifier 7 is omitted and the oscilloscope 10 is replaced by a color television monitor 21. The output video signal from the television camera 4 is fed through the calibrated variable delay system 8 to the red channel input of the monitor 21, and is also fed direct to the blue channel input of the monitor. Thus, the two images formed on the screen of the monitor are differently colored, one red and the other blue.

Figure 5:
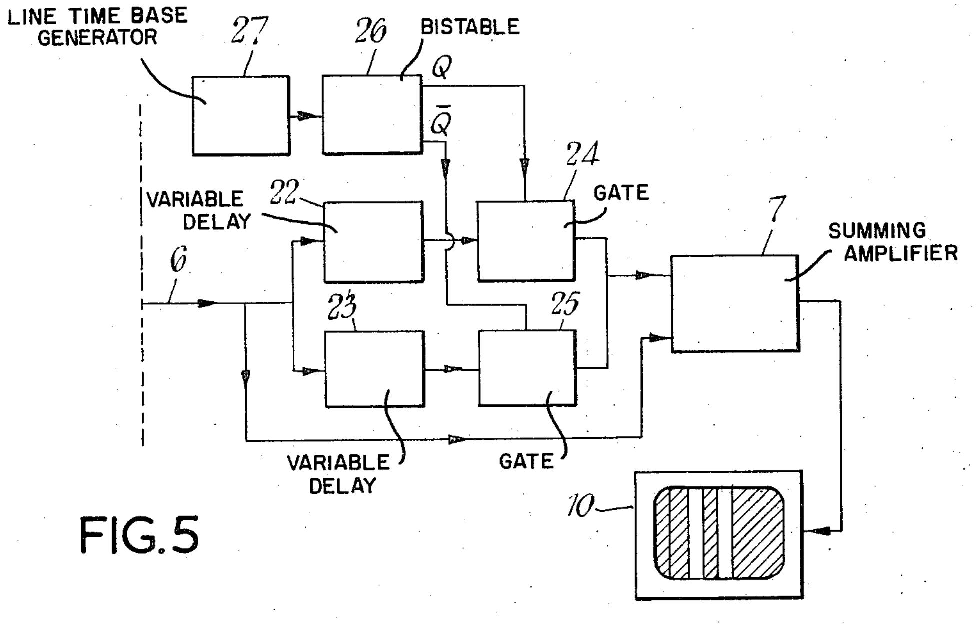

Furthermore, it would be possible to vary cyclically the lateral separation of the two images to produce a flexible Go-No go gauging system of analogous type to that described in British Pat. Specification No. 948,273. FIG. 5 shows a modification of FIG. 1 whereby such cyclic variation of the lateral separation of the images may be achieved. In the case of FIG. 5 the calibrated variable delay system 8 of FIG. 1 is omitted and in its place there is employed an arrangement comprising two variable delay circuits 22 and 23 each having an input connected to the line 6 for receiving the output video signal from the camera 4. The circuits 22 and 23 have outputs connected through respective gates 24 and 25 to the said other input of the summing amplifier 7. The gates 24 and 25 are controlled by a bistable circuit 26, which is itself so controlled by a line time base generator 27 that at the end of each line defined by the line time base generator the bistable circuit 26 changes state. The connections between the bistable circuit 26 and the gates 24 and 25 are such that when the bistable circuit 26 is in one of its two stable states the gate 24 is open and the gate 25 is closed whilst when the bistable circuit is in its other stable state the gate 24 is closed and the gate 25 is open. Thus, if the circuits 22 and 23 are set to apply different respective delays to the output video signal on the line 6, alternate lines of the video signal applied to the said other input of the summing amplifier are delayed by different amounts with respect to the video signal on the line 6, and consequently one image of the pair of images formed on the screen of the oscilloscope appears to vibrate from side to side across the screen with respect to the other image. The differential delaying of alternate lines results in a loss of vertical resolution of the images as seen on the screen, but this could be rendered unimportant by using a large number of lines per frame. Furthermore, resolution in the vertical direction is not so important to accuracy of measurement as resolution in the horizontal direction.

I claim:

1. Microscope apparatus, comprising a television camera unit for receiving an optical image, of an object under investigation, formed by means of a microscope objective, and producing from that image a video signal representative thereof, electrical image-splitting circuitry connected to receive the said video signal and operable to produce therefrom, on a television display unit, a pair of images which are not of mutually reversed contrast and which are each representative of the said optical image and are displaced in relation to one another across the image surface of the display unit by a selectively variable distance, so that the said distance can be varied for sizing purposes.

2. Apparatus as claimed in claim 1, wherein said electrical circuitry has an input terminal, connected to receive said video signal, and comprises time base generation means connected to the input terminal and operable to generate a line time base signal and a frame time base signal, a summing amplifier having two inputs of which one is connected to receive the line time base signal, and a circuit connected to receive the frame time base signal and adapted to provide at an output thereof, which is connected to the other input of the summing amplifier, a signal which during alternate frames defined by the frame time base signal has two potential levels having therebetween a selectively variable potential difference, said electrical circuitry having three output terminals of which a first is connected to said input terminal, a second is connected to the output of the summing amplifier and the third is connected to receive the frame time base signal from the time base generation means, the first output terminal being for connection to an intensity modulation input of the television display unit and the second and third output terminals being for connection to horizontal and vertical deflection inputs respectively of the television display unit.

3. Apparatus as claimed in claim 1, wherein the television camera unit is operable with an interlaced scan and said electrical circuitry has an input terminal, connected to receive said video signal, and comprises time base generation means connected to the input terminal and operable to generate a line time base signal and a frame time base signal, a summing amplifier having two inputs of which one is connected to receive the line time base signal, and a circuit connected to receive the frame time base signal and adapted to provide at an output thereof, which is connected to the other input of the summing amplifier, a signal which during alternate pairs of consecutive frames defined by the frame time base signal has two potential levels having therebetween a selectively variable potential difference, said electrical circuitry having three output terminals of which a first is connected to the said input terminal, a second is connected to the output of the summing amplifier and the third is connected to receive the frame time base signal from the time base generation means, the first output terminal being for connection to an intensity modulation input of the television display unit and the second and third output terminals being for connection to horizontal and vertical deflection inputs respectively of the television display unit.

4. Apparatus as claimed in claim 1, wherein said electrical circuitry comprises a variable delay circuit and a summing amplifier having two inputs, the variable delay circuit and the summing amplifier being connected so that said video signal is applied both to the variable delay circuit and to a first input of the summing amplifier, the output of the variable delay circuit being connected to a second input of the summing amplifier.

5. Apparatus as claimed in claim 1, wherein said electrical circuitry includes means connected to vary the contrast of said pair of images.

6. Apparatus as claimed in claim 1, wherein said electrical circuitry includes means connected to vary said distance cyclically between first and second selected values.

7. A sizing instrument, comprising a microscope objective which forms an optical image of an object being sized, a television camera unit mounted to receive said optical image and to produce from that image a video signal representative thereof, a television display unit, and electrical image-splitting circuitry which connects said television camera unit and said television display unit and which employs said video signal to produce on an image surface of the television display unit a pair of images which are not of mutually reversed contrast and which are each representative of the said optical image and are displaced in relation to one another across said image surface by a distance which is selectively variable for sizing purposes.

8. An instrument as claimed in claim 7, wherein said electrical circuitry has an input terminal, connected to receive said video signal, and comprises time base generation means connected to the input terminal and operable to generate a line time base signal and a frame time base signal, a summing amplifier having two inputs of which one is connected to receive the line time base signal, and a circuit connected to receive the frame time base signal and adapted to provide at an output thereof, which is connected to the other input of the summing amplifier, a signal which during alternate frames defined by the frame time base signal has two potential levels having therebetween a selectively variable potential difference, said electrical circuitry having three output terminals of which a first is connected to said input terminal, a second is connected to the output of the summing amplifier and the third is connected to receive the frame time base signal from the time base generation means, the first output terminal being connected to an intensity modulation input of the television display unit and the second and third output terminals being connected to horizontal and vertical deflection inputs respectively of the television display unit.

9. An instrument as claimed in claim 7, wherein the television camera unit is operable with an interlaced scan and the said electrical circuitry has an input terminal, connected to receive said video signal, and comprises time base generation means connected to the input terminal and operable to generate a line time base signal and a frame time base signal, a summing amplifier having two inputs of which one is connected to receive the line time base signal, and a circuit connected to receive the frame time base signal and adapted to provide at an output thereof, which is connected to the other input of the summing amplifier, a signal which during alternate pairs of consecutive frames defined by the frame time base signal has two potential levels having therebetween a selectively variable potential difference, said electrical circuitry having three output terminals of which a first is connected to the said input terminal, a second is connected to the output of the summing amplifier and the third is connected to receive the frame time base signal from the time base generation means, the first output terminal being connected to an intensity modulation input of the television display unit and the second and third output terminals being connected to horizontal and vertical deflection inputs respectively by the television display unit.

10. An instrument as claimed in claim 7, wherein said electrical circuitry comprises a variable delay circuit and a summing amplifier having two inputs, the variable delay circuit and the summing amplifier being connected so that said video signal is applied both to the variable delay circuit and to a first input of the summing amplifier, the output of the variable delay circuit being connected to a second input of the summing amplifier.

11. An instrument as claimed in claim 7, wherein said electrical circuitry includes means connected to vary the contrast of said pair of images.

12. An instrument as claimed in claim 7, wherein said electrical circuitry includes means connected to vary said distance cyclically between first and second selected values.

13. An instrument as claimed in claim 7, wherein the television display unit is capable of providing colored images and the said electrical circuitry includes means for producing the said pair of images in different respective colors.

* * * * *